United States Patent
Senda et al.

(10) Patent No.: US 9,823,641 B2
(45) Date of Patent: Nov. 21, 2017

(54) PLC COMMUNICATION SYSTEM

(71) Applicants: JTEKT Corporation, Osaka (JP);
TOYOTA JIDOSHA KABUSHIKI KAISHA, Toyota (JP)

(72) Inventors: Terukazu Senda, Obu (JP); Satoshi Kato, Kariya (JP); Toshio Aono, Chiryu (JP); Toshiyuki Kamauchi, Nagakute (JP); Masanori Ido, Toyota (JP)

(73) Assignees: JTEKT Corporation, Osaka-shi (JP);
TOYOTA JIDOSHA KABUSHIKI KAISHA, Toyota-shi (JP)

( * ) Notice: Subject to any disclaimer, the term of this patent is extended or adjusted under 35 U.S.C. 154(b) by 91 days.

(21) Appl. No.: 14/243,159

(22) Filed: Apr. 2, 2014

(65) Prior Publication Data
US 2014/0336784 A1 Nov. 13, 2014

(30) Foreign Application Priority Data

May 7, 2013 (JP) .................................. 2013-097451

(51) Int. Cl.
G05B 19/02 (2006.01)
G05B 19/05 (2006.01)
(Continued)

(52) U.S. Cl.
CPC ....... G05B 19/058 (2013.01); G05B 19/4185 (2013.01); H04L 12/403 (2013.01);
(Continued)

(58) Field of Classification Search
CPC .................. G05B 19/02; G05B 19/052; G05B 2219/1204; H04L 12/403; H04L 41/0677; H04L 41/0631; H04L 41/22
See application file for complete search history.

(56) References Cited

U.S. PATENT DOCUMENTS 5,226,037 A * 7/1993 Satomi .................... H04L 12/56
340/2.9
5,390,326 A * 2/1995 Shah .................... G06F 11/2007
370/222
(Continued)

FOREIGN PATENT DOCUMENTS

EP 1 710 642 A2 10/2006
JP 2-235104 9/1990
(Continued)

OTHER PUBLICATIONS

U.S. Appl. No. 14/090,564, filed Nov. 26, 2013, Kato, et al.
(Continued)

*Primary Examiner* — Christopher E Everett
*Assistant Examiner* — David Wynne
(74) *Attorney, Agent, or Firm* — Oblon, McClelland, Maier & Neustadt, L.L.P.

(57) ABSTRACT

The PLC communication system associated with the invention is characterized in that the system comprises a programmable logic controller (PLC), a plurality of processing devices, at least three communication processing nodes provided at the PLC and at the plurality of processing devices respectively to establish communication of the PLC and each of the processing devices and an interconnecting device and a plurality of communication lines for connecting the communication processing nodes with one another to establish data communication among the communication processing nodes. The PLC detects a state of communication failure and a display device displays an abnormal portion in a communication route based on the number of occurrences of the state of communication failure in respective interconnecting device and plurality of communication lines.

9 Claims, 16 Drawing Sheets

(51) Int. Cl.
*G05B 19/418* (2006.01)
*H04L 12/24* (2006.01)
*H04L 12/403* (2006.01)
*H04L 12/26* (2006.01)

(52) U.S. Cl.
CPC ...... *H04L 41/0677* (2013.01); *H04L 43/0811* (2013.01); *H04L 43/10* (2013.01); *G05B 2219/15026* (2013.01); *H04L 43/16* (2013.01); *Y02P 90/18* (2015.11)

(56) References Cited

U.S. PATENT DOCUMENTS

| | | | | |
|---|---|---|---|---|
| 5,790,558 | A * | 8/1998 | Nakamura | G05B 19/4063 714/704 |
| 6,970,919 | B1 * | 11/2005 | Doi | H04L 41/0631 345/440 |
| 7,166,930 | B2 * | 1/2007 | Young | G09G 3/3413 307/64 |
| 7,437,615 | B2 * | 10/2008 | Iwamitsu | G06F 11/0727 714/43 |
| 2002/0181503 | A1 * | 12/2002 | Montgomery, Jr. | H04J 3/085 370/468 |
| 2003/0191831 | A1 * | 10/2003 | Hu | H04L 69/40 709/223 |
| 2004/0155899 | A1 * | 8/2004 | Conrad | H04L 43/0817 715/736 |
| 2004/0158780 | A1 * | 8/2004 | Conrad | H04L 41/22 714/100 |
| 2006/0107086 | A1 * | 5/2006 | Walker | H04L 12/2602 714/4.1 |
| 2006/0230188 | A1 * | 10/2006 | Shirane | G05B 19/052 710/1 |
| 2008/0151744 | A1 * | 6/2008 | Yakushiji | H04L 12/2697 370/219 |
| 2009/0207922 | A1 * | 8/2009 | Yokomitsu | H04B 3/542 375/257 |
| 2010/0063754 | A1 * | 3/2010 | Thomas | G01R 31/086 702/59 |
| 2011/0179342 | A1 * | 7/2011 | Kim | H04L 43/0817 714/807 |
| 2012/0026891 | A1 * | 2/2012 | Kamiya | H04L 41/0677 370/242 |
| 2014/0336784 | A1 * | 11/2014 | Senda | G05B 19/4185 700/7 |

FOREIGN PATENT DOCUMENTS

| | | |
|---|---|---|
| JP | 6-324723 | 11/1994 |
| JP | 2000-101490 A | 4/2000 |
| JP | 2002-101490 | 4/2002 |
| JP | 2009-202720 A | 9/2009 |
| JP | 2011-147132 A | 7/2011 |

OTHER PUBLICATIONS

Extended European Search Report dated Jun. 9, 2017 in European Patent Application No. 14164139.9.
Office Action dated Nov. 8, 2016 in Japanese Patent Application No. 2013-097451 (with English translation).

* cited by examiner

PLC COMMUNICATION SYSTEM

INCORPORATION BY REFERENCE

This application is based on and claims priority under 35 U.S.C. 119 with respect to Japanese Application No. 2013-097451 filed on May 7, 2013, the entire content of which is incorporated herein by reference.

BACKGROUND OF THE INVENTION

Field of the Invention

This invention relates to a system for establishing communications between a PLC (programmable logic controller) and other devices/appliances, and more particularly, to a communication system which can detect and display an abnormal portion in case of occurrence of abnormality in a communication route.

Description of Related Art

A programmable logic controller (hereinafter referred to as, "PLC" or "programmable controller") is operated to establish communications with other processing devices. According to a Patent Document 1, the PLC judges that a communication abnormality has occurred when a data sent from one station to another was unable to be received for a predetermined time period and after a timer reached a predetermined time-up limit time. Further, according to another Patent Document 2, whether the data communication was successful or not, is confirmed based on the frequency of retrial processing by displaying the number of times of retrial processing.

LIST OF RELATED ART

Patent Document

[PATENT DOCUMENT 1: JP6-324723A]
[PATENT DOCUMENT 2: JP2-235104A]

DISCLOSURE OF INVENTION

Problems to be Solved by the Invention

However, in case of a system where a plurality of communication devices or appliances is connected with one another to form a communication network, it would be very difficult to recognize which portion of the communication route is in abnormal state. This invention was made, considering the above issues of the related art and it is an object of the invention to provide a PLC communication system in which a worker or an operator engaged in the system can find which portion in the communication route is in abnormal state.

SUMMARY OF THE INVENTION

Means to Solve the Problems

A PLC communication system according to one aspect of the invention comprises a programmable logic controller (PLC), a plurality of processing devices, at least three communication processing nodes provided at the PLC and at the plurality of processing devices respectively to establish communication among the PLC and the plurality of processing devices and an interconnecting device and a plurality of communication lines for connecting the communication processing nodes to form a communication route among the communication processing nodes, wherein the programmable logic controller (PLC) detects a communication failure state in the communication route formed by the communication processing nodes. A display device is installed which displays an abnormal portion in the communication route based on the number of occurrences of the detected communication failure state in the interconnecting device and the plurality of communication lines.

Preferable aspects of the PLC communication system according to the invention recited above will be explained hereinafter.

Preferably, according to the second aspect of the invention, the display device displays the abnormal portion in the communication route, excluding a portion forming a normal communication route from among the communication routes which are judged to be in the communication failure state in the interconnecting device and the plurality of communication lines.

Preferably, according to the third aspect of the invention, the display device displays a communication circuit including all of the communication routes and the abnormal portion in the communication routes by differentiating the abnormal portion from the other portions.

Preferably, according to the fourth aspect of the invention, the display device displays a portion in which the number of occurrences of the detected communication failure state is equal to or more than a first threshold value as the abnormal portion and a portion in which the number of occurrences of the detected communication failure state is less than the first threshold value and equal to or more than a second threshold value as a warning portion, wherein the display device displays the warning portion by differentiating from the abnormal portion and the other portions.

Preferably, according to the fifth aspect of the invention, the display device displays the number of occurrences of the communication failure state in the interconnecting device and the plurality of communication lines, respectively.

Preferably, according to the sixth aspect of the invention, an FL-net (FA LINK network) is used for the communication lines and each of the communication processing nodes receives and sends a token from one communication processing node after another and when the token is not received from a previous communication processing node, a retrial processing is executed, wherein a re-issued token is sent to a next communication processing node and the PLC recognizes the communication route connecting the previous and the next communication processing nodes to be the communication route which is in the communication failure state, after the retrial processing was executed with a predetermined number of times.

Preferably, according to the seventh aspect of the invention, the communication processing nodes send data to another communication processing node based on an address to which the data is to be sent and when the data cannot be sent, the retrial processing is executed to resend the data, wherein the PLC recognizes a route connecting the communication processing node which sends the data and the communication processing node which receives the data to be the route indicating the state of communication failure when such retrial processing is executed with a predetermined set number of times.

Preferably, according to the eighth aspect of the invention, the display device further displays the number of the times of retrial processing in the each of the communication processing nodes.

According to the PLC communication system of the first aspect of the invention, the display device displays the abnormal portion based on the number of times of forming a route indicating the state of communication failure in the respective interconnecting device and the plurality of communication lines. Accordingly, more the number of times for forming the route indicating the state of communication failure, higher the probability that the portion is in abnormal state. Therefore, by displaying the portion depending on the number of times for forming the route indicating the state of communication failure, the worker of the system can easily specify the abnormal portion.

Further, according to the second aspect of the invention, there would be a case where a portion of one communication route formed between one communication processing nodes may form another communication route between another communication processing nodes and accordingly, even when the one communication route between the one communication processing nodes is in normal state, the another communication route between the another communication processing nodes may be in the state of communication failure. In such case, the portion forming the normal communication route may be counted as a portion forming the communication failure route. According to the feature of claim 2, as long as the portion in the communication route is in normal state, even such route is counted as a communication failure state route, such portion can be excluded from the counting of the abnormal state routes and the abnormal portion can be correctly specified.

According to the third aspect of the invention, by displaying a communication circuit including all communication lines and at the same time displaying the abnormal portion in a different way, the abnormal portion can be easily located.

According to the fourth aspect of the invention, in a case where the number of times of forming the state of communication failure is high, such case may be judged to be abnormal, but in a case where the number of times of forming the state of communication failure is not so high as to be judged to be abnormal, such case may be judged to be abnormal. According to the feature of this fourth aspect of the invention, since the portions are displayed in three levels, abnormal portion, warning portion and the other portion (the other portion is defined to be the portion other than abnormal and warning), a worker engaged in the system can easily manage the system and further, the worker is reminded of paying attention to a warning state portion not to be changed to the abnormal state.

According to the fifth aspect of the invention, the display device displays the number of times forming the state of communication failure and accordingly, what type of phenomenon is occurring in the abnormal portion can be confirmed. Further, when a plurality of portions is judged to be abnormal, actual abnormality test can be performed in accordance with the number of times forming the state of communication failure from the high number to the low number. This can detect the abnormal portion in early stage.

According to the sixth aspect of the invention, by using the FL-net for the communication line, the abnormal portion can be surely confirmed.

Further, according to the seventh aspect of the invention, when the data has an address to be sent to, the abnormal portion can be surely confirmed using for example, a TCP (Transmission Control Protocol).

According to the eighth aspect of the invention, by displaying the number of retrial processing, occurrence of abnormality can be predicted. Further, by displaying the number of retrials, which communication processing node is abnormal can be confirmed. For example, if a plurality of portions is judged to be abnormal, a portion forming the communication route by the communication processing node having high number of retrial processing can be confirmed prior to other route formed by the other communication processing nodes.

BRIEF DESCRIPTION OF THE ATTACHED DRAWINGS

Various aspects of this invention will become apparent to those skilled in the art from the following detailed description of the preferred embodiments, when read in light of the accompanying drawings, in which.

Figure 1:
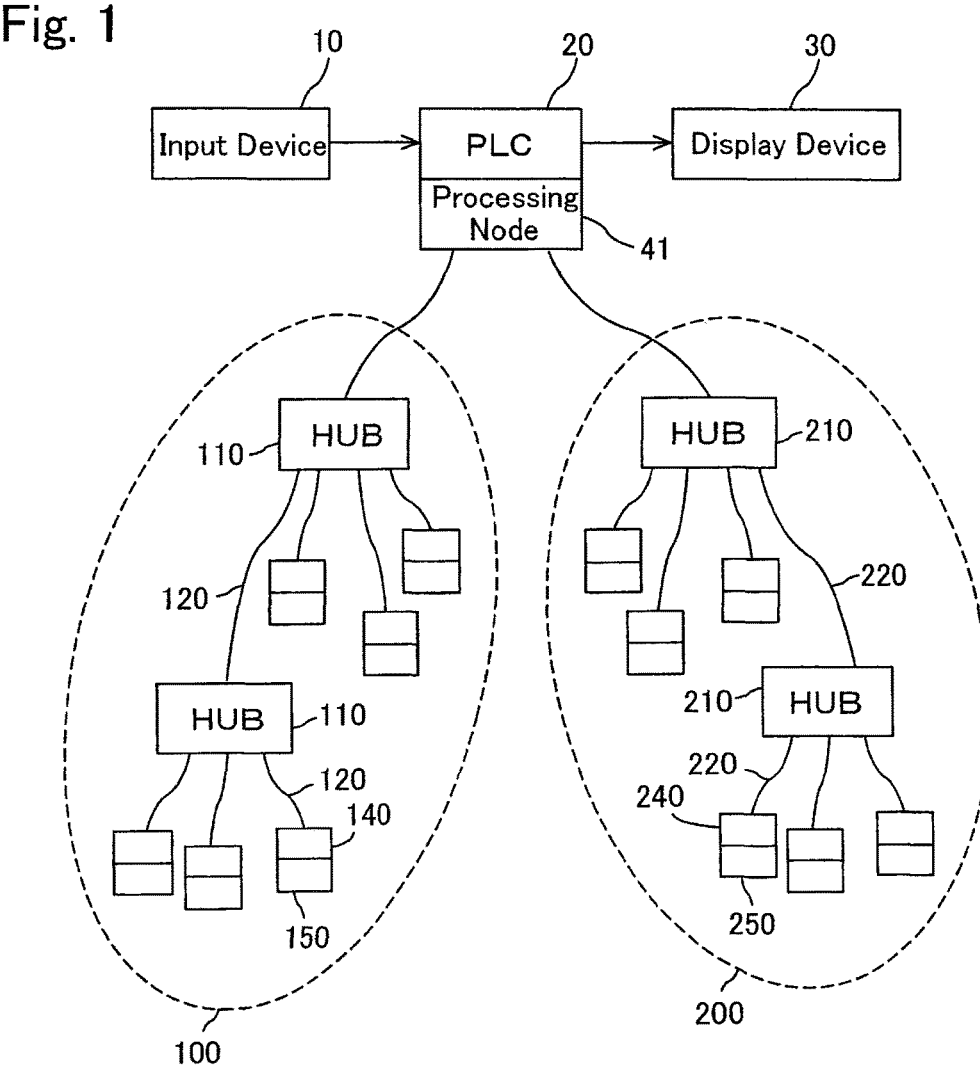
FIG. 1 is an overall structure indicating the network system including the PLC communication system according to the first embodiment of the invention.
Figure 2:
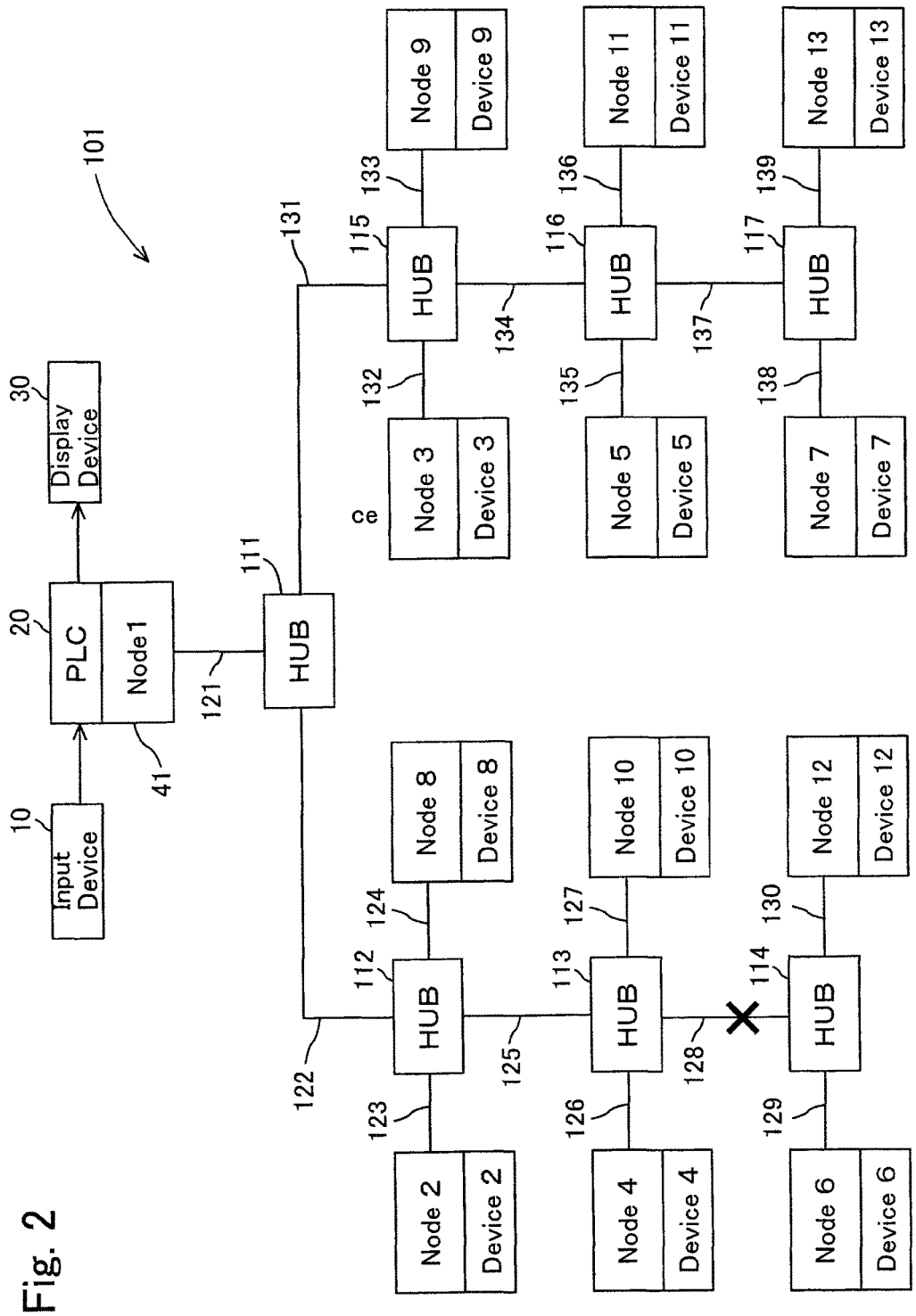
FIG. 2 is a view showing a communication circuit in the network structure (PLC system) in which a portion of the FL-net in FIG. 1 is taken out, wherein the numerals numbered to each node indicate the order of transferring a token (the transmission privilege) and the symbol×in the drawing indicates a broken (disconnected) portion of communication line.
Figure 3:
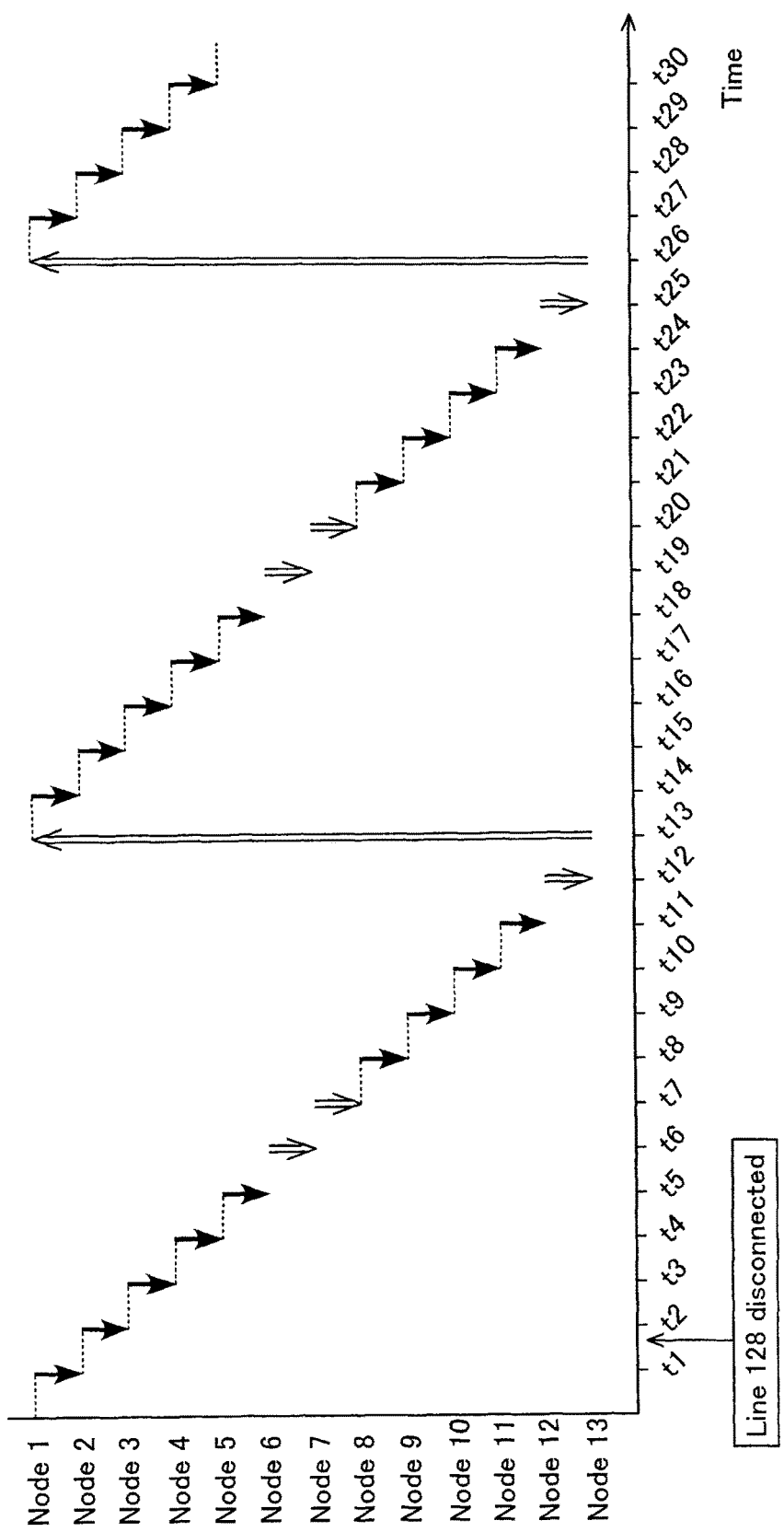
FIG. 3 is a view showing the transfer of token changing the location with the time elapsed according to the communication circuit of FIG. 2, wherein the arrows with bold line indicate the transfer of the token already issued and the arrows with double line indicate the transfer of token which was re-issued.
Figure 11:
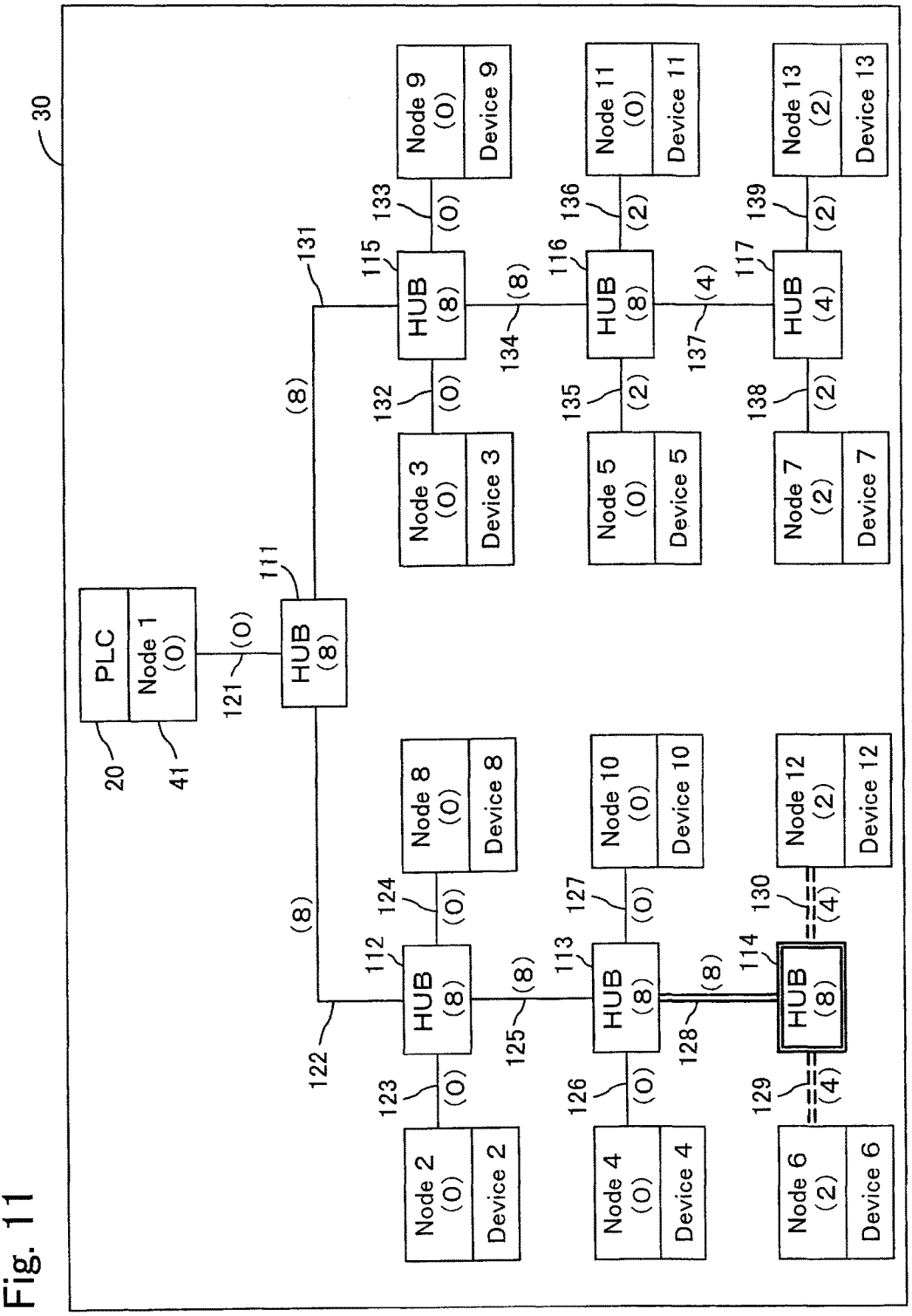
Figure 12:
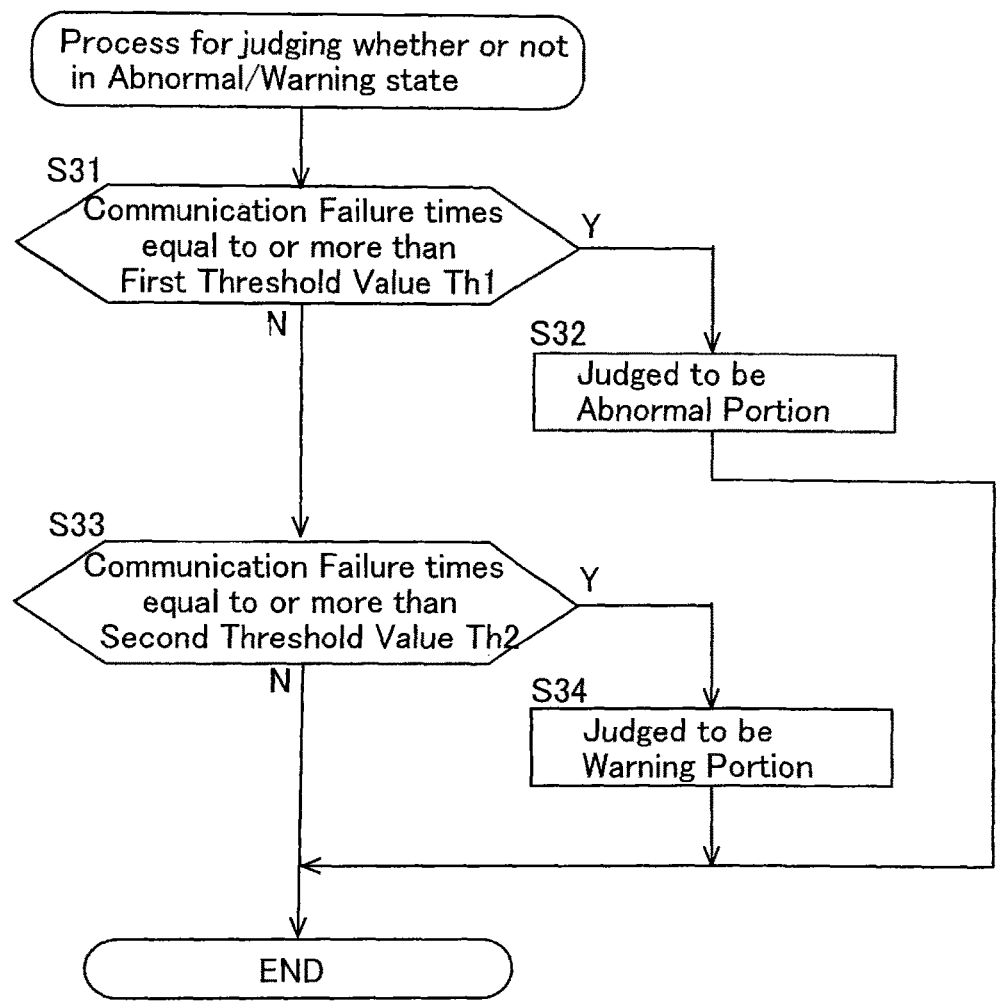
Figure 13:
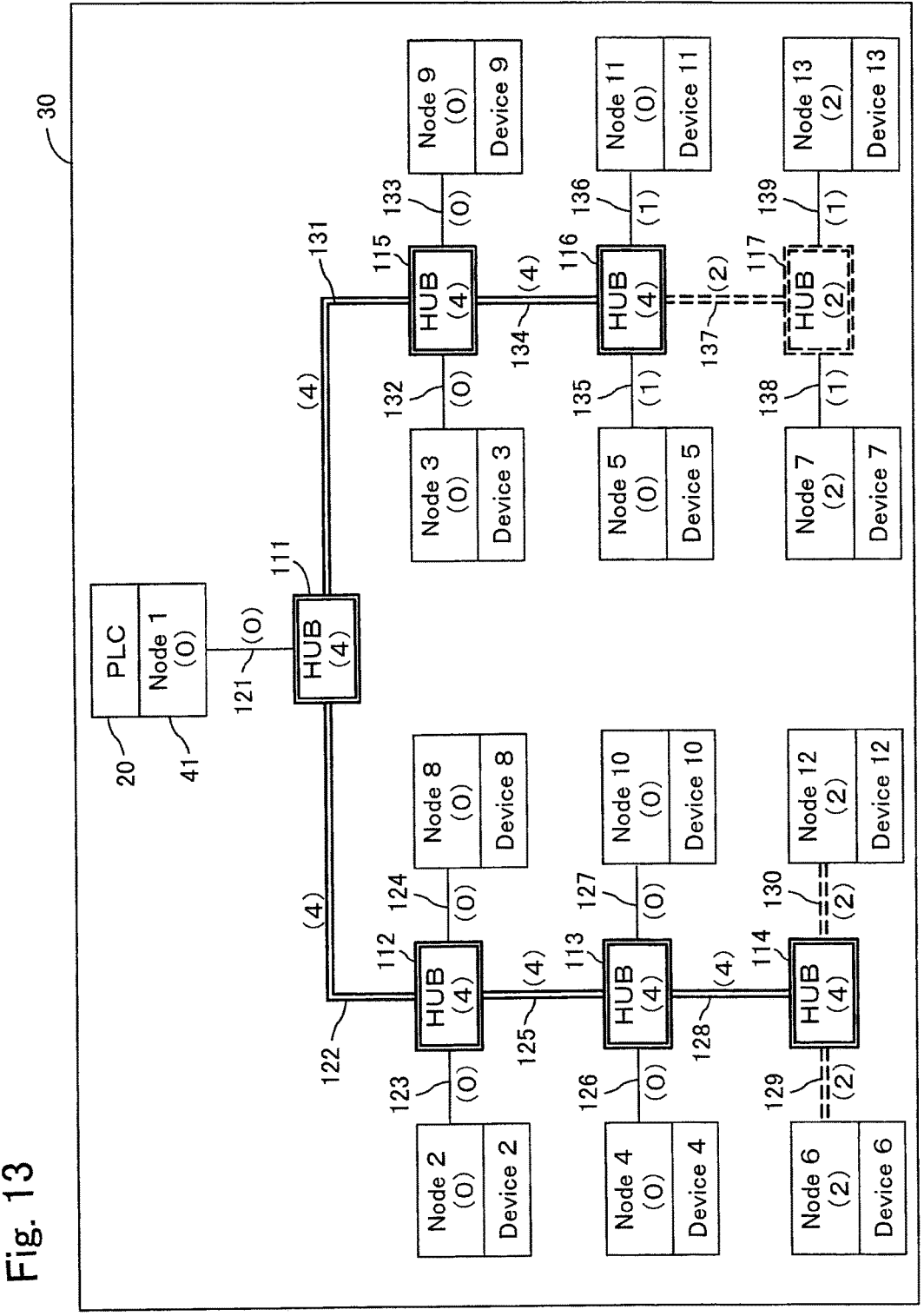
Figure 14:
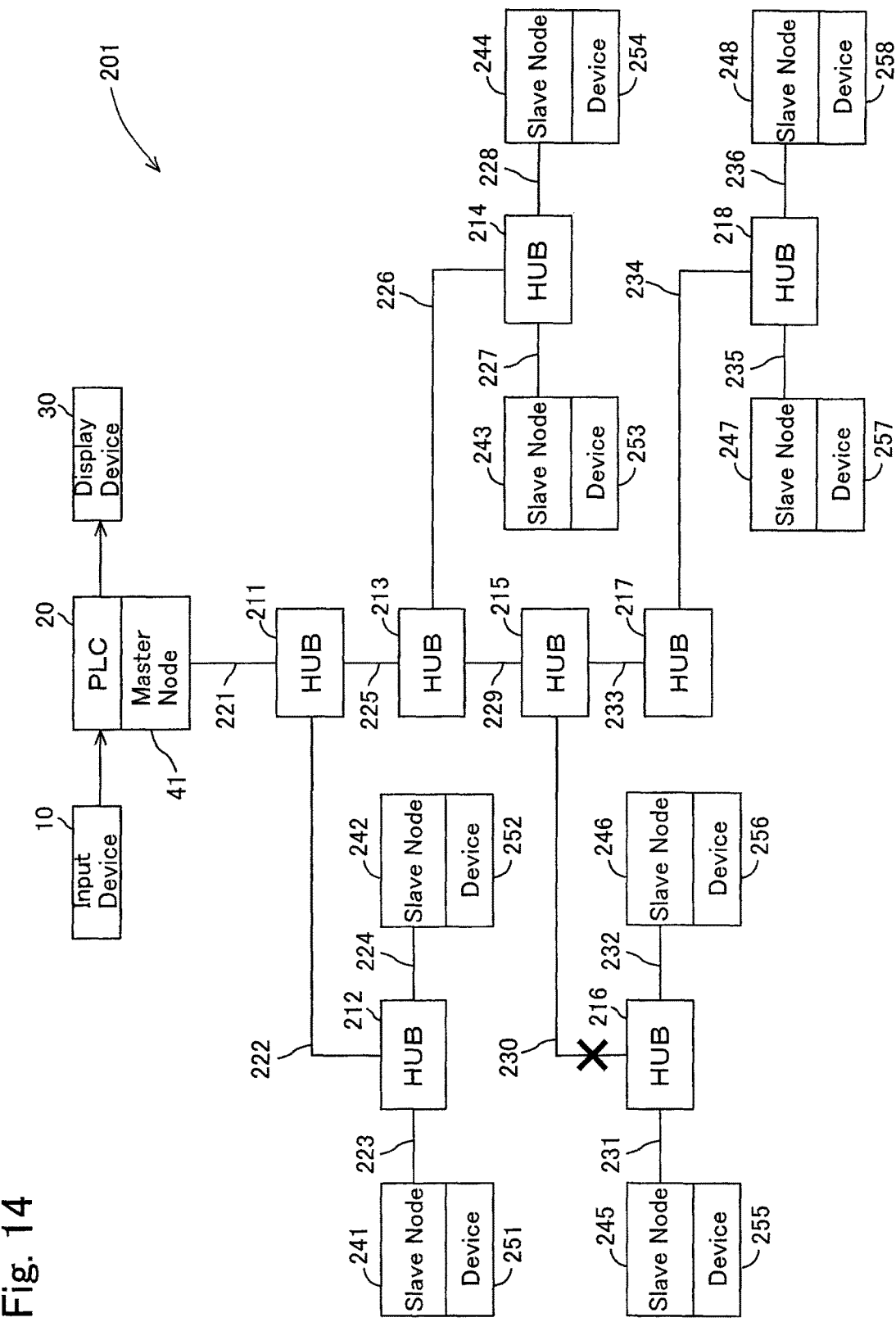
Figure 15:
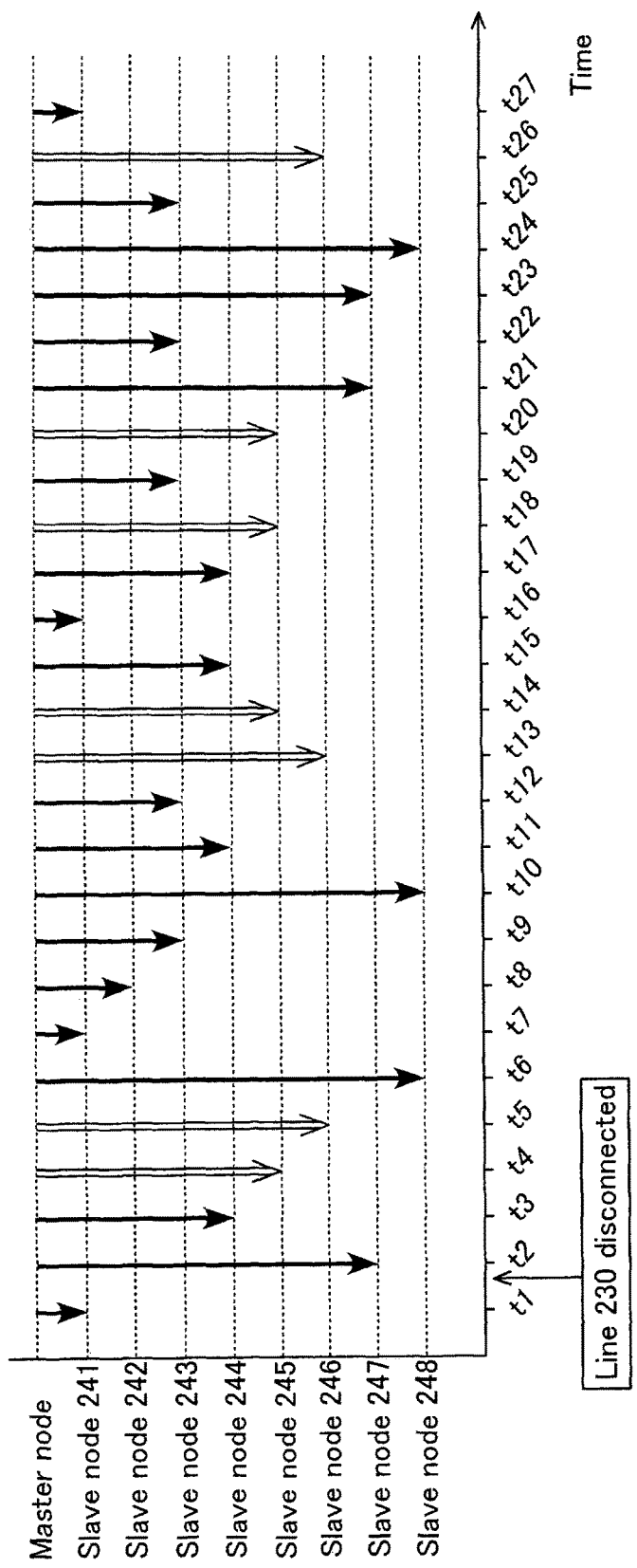
Figure 16:
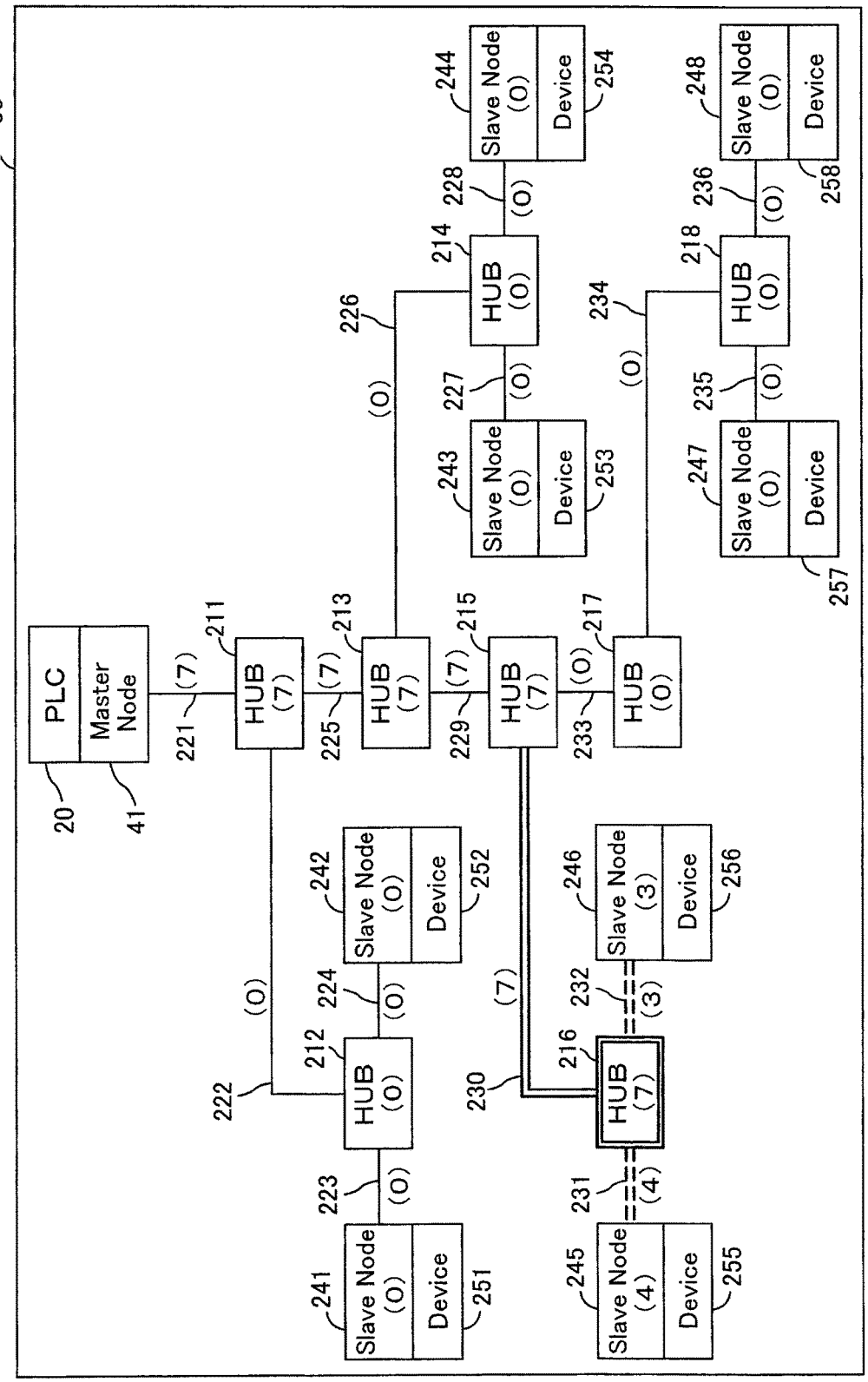

FIG. 11 is a view showing a modified embodiment of the first embodiment and indicating the content of display at the time t30 in FIGS. 2 and 3, wherein the numerals in parentheses in the HUB and communication lines indicate the number of times of occurrence of the state of communication failure and the numerals in parentheses in the nodes indicate the number of times of the execution of the retrial processing;

FIG. 12 is a flowchart showing the judging process for judging whether the state is abnormal or warning according to the display device of the second embodiment of the invention;

FIG. 13 is a view showing the content of the display in which the process of FIG. 12 is applied;

FIG. 14 is a view showing the branched network structure (PLC system) in which a portion of the DeviceNet (Trademark) in FIG. 1 is taken out according to the third embodiment of the invention, wherein the taken out branched network uses the TCP for sending data and the symbol× indicates a broken portion of communication line;

FIG. 15 is a view showing one example of data communication sent from master node to the slave nodes, varying with the time according to the structure of FIG. 14, wherein the arrows with bold line show that the data has been transmitted to the subject slave node and the arrows with double line show that the data was not transmitted and that the master node performed the retrial processing; and FIG. 16 is a view showing the content of the display at the time t27 in FIG. 15.

DETAILED DESCRIPTION OF THE PREFERRED EMBODIMENTS OF THE INVENTION

First Embodiment (Overall Structure of the Network System)

The overall network structure including the PLC communication system according to the first embodiment will be explained hereinafter with reference to FIG. 1. As shown in FIG. 1, the network system includes a programmable logic controller (PLC) 20 which controls machine tools and industrial robots and the system communicates with other processing devices.

The network system includes, in addition to the PLC 20, an input device 10 for inputting parameters and information of communication line circuits to the PLC 20 and a display device 30 which displays the information from the PLC 20. Further, the system includes a communication processing node 41 which is connected to the PLC 20. The processing node 41 is applicable to and compatible with an FL-net or the DeviceNet (Registered Trademark).

The network system in FIG. 1 establishes an FL-net network 100 and a DeviceNet network 200 through the communication processing node 41. The FL-net network 100 includes a plurality of processing devices 150 (hereinafter simply referred to as "devices"), a plurality of communication processing nodes 140 provided at each of the devices 150, interconnecting devices 110 (HUB) and a plurality of communication lines 120 for connecting the communication processing node 41 with each communication processing node 140 for data exchange therebetween. The DeviceNet network 200 includes a plurality of processing devices 250 (hereinafter simply referred to as "devices"), a plurality of communication processing nodes 240 provided in each of the devices 250 serving as a slave node, interconnecting devices 210 and a plurality of communication lines 220 for connecting the communication processing node 41 as a master node to the slave nodes with each communication processing node 240 as a slave node for data communication therebetween.

Other devices 150 which are connected to the communication processing node 41 by the FL-net network 100 include, for example, other different PLCs. The other devices 250 which are connected to the communication processing node 41 by the DeviceNet network 200 include other PLCs and I/O modules. It is noted that in the FL-net network 100 or the DeviceNet network 200, the number of devices 150 or 250 to be connected can be increased by using the HUBs as the interconnecting devices 110 or 210. In the DeviceNet network 200, the interconnecting devices 210 are the HUBs such as T-branched taps.

A worker or operator engaged in the network inputs various values into the input device 10 for the PLC 20 and in addition, inputs setting change information to be displayed on the display device 30. The PLC 20 obtains state information on other devices 150 and 250 through the HUBs 110 and 210 and the communication lines 120 and 220 and executes calculations or operation processing. Further, the PLC 20 sends the result of calculations or the obtained state information of the devices to the other devices 150 and 250. Still further, the PLC 20 can confirm the ON or OFF state of the power sources of the communication processing nodes 140 and 240. The PLC 20 also detects the communication state between the communication processing nodes 140 and 240 whether the communication therebetween is in communication failure state or in normal state.

The display device 30 displays all communication lines (network structural circuit). Further, the display device 30 displays the abnormal states and the warning states in different ways to differentiate from each other (for example, indicating with different colors). It is noted that the display device 30 may display only the information which can specify the abnormal states or the warning states, without displaying the entire system circuit.

(PLC Communication System Structure)

Next, the PLC communication system 101 according to the embodiment of the invention will be explained hereinafter with reference to FIG. 2. The PLC communication system 101 corresponds to the portion of the network system illustrated in FIG. 1 and such portion includes input device 10, PLC 20, display device 30, communication processing node 41 and FL-net network 100. However, only a portion of the communication processing node in the FL-net network 100 is shown in FIG. 2.

As shown in FIG. 2, the PLC communication system 101 includes the input device 10, PLC 20, display device 30, a communication processing node 1 (hereinafter simply referred to as "node" 1), nodes 2 through 13 connected with one another through the HUBs 111 through 117 as the interconnecting devices and the communication lines 121 through 139 (hereinafter referred to as simply "lines") and other devices 2 through 13 which are connected to the nodes 2 through 13 respectively. The PLC communication system 101 further includes hubs (HUB 111 through 117), which comply with the FL-net network, and the lines 121 through 139. The lines 121 through 139 connect the nodes 1 through 13 with the HUBs 111 through 117, respectively.

According to the FL-net network 100, each node 1 through 13 sends the data token (data transmission privilege) in a predetermined order. As shown in FIG. 2, the order of sending the token is the order of node number (descending order of number). For example, the order of sending the tokens is from node 1 to node 2, to node 3, to node 4, to node 5, to node 6, to node 7, to node 8, to node 9, to node 10, to node 11, to node 12 and to node 13. The node which holds the token can send the data to another node. In other words, only the node which holds the token can send the data to another node but the node which does not have token cannot send the data to another. For example, when the node 2 receives the token from the previous order node 1, the node 2 sends the data to the nodes 1 and 3 through 13 other than itself (node 2) within a predetermined time period from the receipt of the token and after the predetermined time period lapsed, the node 2 sends the token which has been received from the node 1, to the node 3.

However, if for some reason, the node 6 could not receive the token from the previous order node 5 within the predetermined time period, the node 6 re-issues the token and sends the reissued token to the next order node 7. This processing is called as "retrial processing". Thus, the node 6 issues a new token and sends the necessary data to other nodes 1 through 5 and 7 through 13 and then send the newly issued token to the next node 7 after the predetermined time lapsed.

(Transfer of Issued Token and Reissuing of Token)

Next, communication failure such as disconnection or breakage will be explained with an example of the disconnection of the line 128. The transfer of issued token and reissuing of token will be explained with reference to FIGS. 2 through 4. As shown in FIGS. 2 and 3, at the time t1, the token is transferred to the node 2 from the node 1. It is noted that in FIG. 3, the arrows with bold line indicate that an already issued token was transferred. Assuming that the line 128 was broken or disconnected immediately after the token was transferred to the node 2, at the time t2, the token is transferred to the node 3 from the node 2 and at the time t3, the token is transferred to the node 4 from the node 3 and in turn the token is transferred to the node 5 from the node 4 at the time t4.

Then, at the time t5, the token is sent to the following (next order) node 6 from the node 5. However, since the line 128 is broken, the token cannot be sent to the node 6 from the node 5. Accordingly, the node 6 reissues a token and at the time t6, the re-issued token is sent to the next node 7. In other words, the node 6 executes the retrial processing. It is noted here that the arrows with double line in FIG. 3 indicate that the re-issued token was successfully transferred.

The node 7 cannot receive the token sent from the node 6, because the line 128 thereto is disconnected. Accordingly, the node 7 reissues a token and the re-issued token is sent to the node 8 at the time t7. Thus, the node 7 also executes retrial processing.

Further, between the time t8 and t10, the token is transferred from the node 8 to node 9, node 10 and node 11. Since the line 128 is broken, at the times of t11 and t12, the nodes 12 and 13 cannot receive the token from the previous nodes 11 and 12, respectively. Therefore, the nodes 12 and 13 reissue a token. In other words, the nodes 12 and 13 execute retrial processing. At the times t14 through 26, the same process is performed as the process performed at the times t1 through t13.

Figure 4:
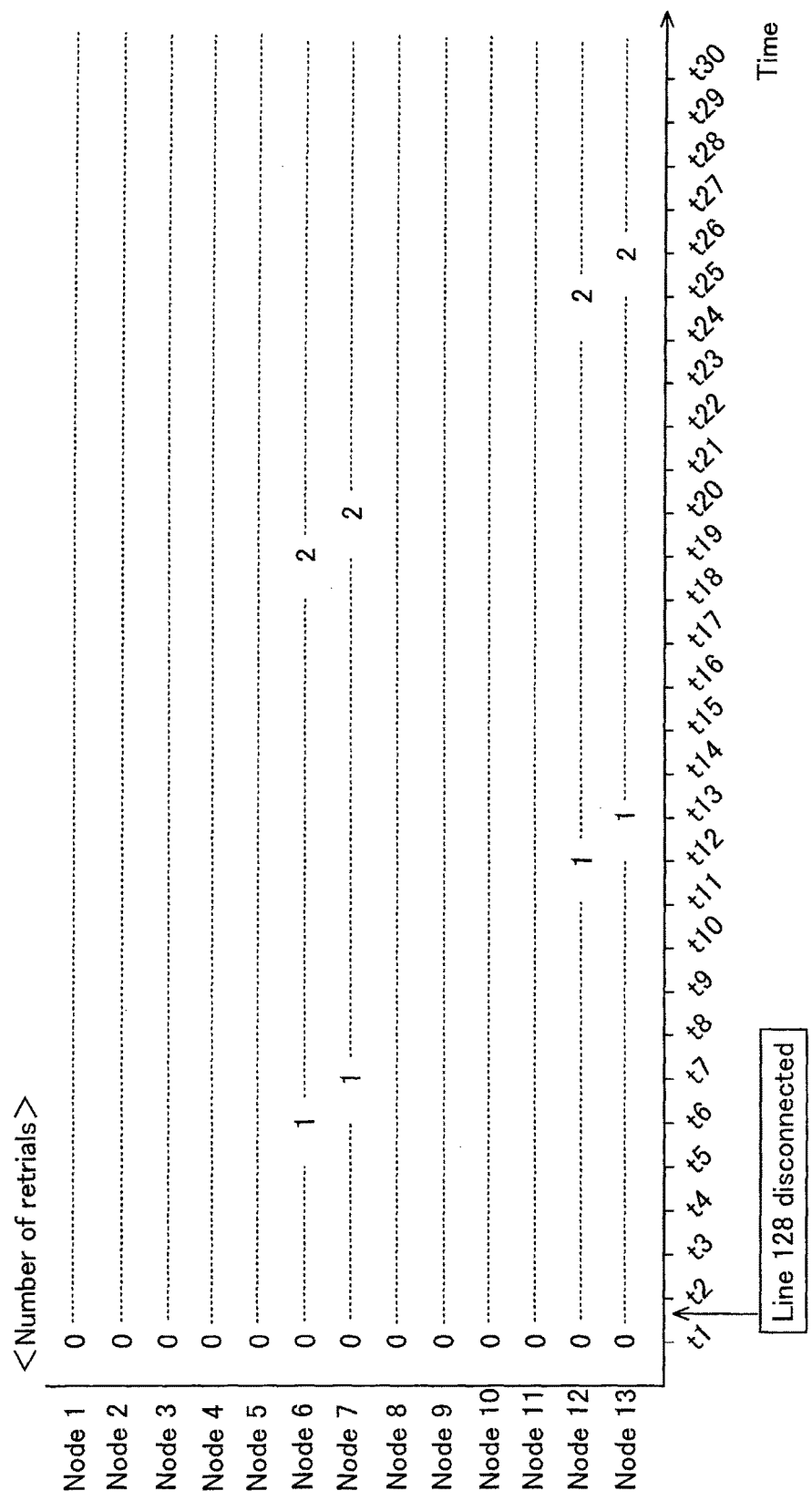
FIG. 4 is a graph showing the number of retrial processing in each communication processing node in FIG. 3.

As shown in FIG. 3, when the token is transferred or re-issued, the number of retries for each node 1 through 13 becomes the numbers shown in FIG. 4. The number of retries of the nodes 1 through 5, 8 through 11 is zero from the time t1 to the time t30. The number of retries of the node 6 is one (1) at the time t6 and two (2) at the time t19. Further, the number of retries of the node 7 is one (1) at the time t7 and two (2) at the time t20. The number of retries of the node 12 is one (1) at the time t12 and two (2) at the time t25. The number of retries of the node 13 is one (1) at the time t13 and two (2) at the time t26.

(Judgment of Communication Failure State by PLC)

Figure 5:
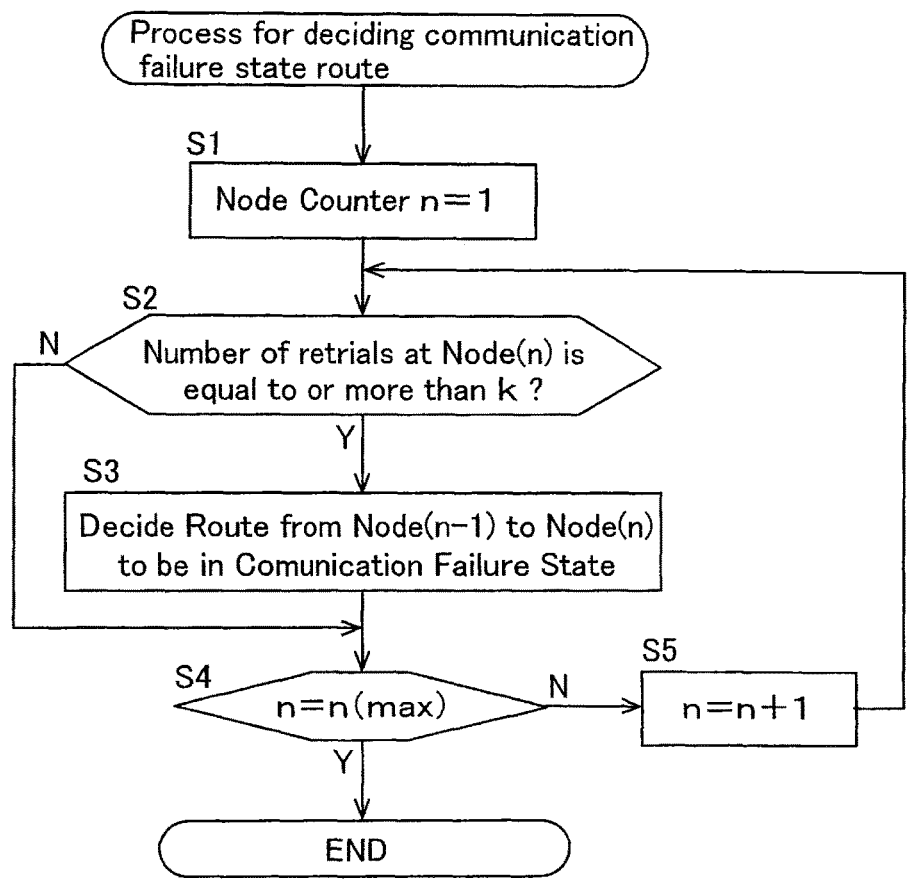
FIG. 5 is a flowchart showing the decision process for deciding a communication route which is in the state of communication failure according to the PLC in FIG. 2.

Next, the judgment of the communication failure state by PLC will be explained hereinafter with reference to FIG. 5. As shown in the flowchart of FIG. 5, initial value of 1 is set for the counter "n" of a node (at the step S1 in FIG. 5) and then by adding one (1) in the counter "n", the following process is performed to all nodes 1 through 13. Next at the step S1, judgment is made whether the number of retrials of the node (n) is equal to or more than the "k" (at the step S2). It is noted that the number "k" has been determined to, for example, 1 or 2. Then, if the value "k" is 1 (k=1), the node with the retrial number is 1 or more than 1 is the subject node for judgment. When the initial value "n" is 1, judgment for the node 1 is made whether the number of retrials is equal to or more than "k".

As shown in FIG. 4, at the time t30, the retrial number of the nodes 1 through 5 and 8 through 11 are all zero and accordingly the judgment indicates "No". On the other hand the number of the nodes 6 and 7 and 12 and 13 is two (2) then, the judgment is "Yes".

Next, when the number of retrials of the node (n) is equal to or more than the set value "k" (at the step S2, Yes), the retrial processing causing route is defined to be the route in state of communication failure (at the step S3). For example, the node 6 has retried two times for sending token, the judgment at the step S2 is "Yes", and the communication route between the node 5 and the node 6 is judged to be the route of the state of communication failure. This route includes the route from line 135 to HUB 116, to line 134, to HUB 115, to line 131, to HUB 111, to line 122, to HUB 112, to line 125, to HUB 113, to line 128, to HUB 114 and to line 129.

After the step S3 and when the judgment in the step S2 is "No", and further when the counter "n" of the node is the max number n (max), the process ends (at the step S4, Yes). On the other hand, if the counter "n" of the node has not reached to the max value "n (max)" (at the step S4, No), number one (1) is added to the counter "n" (at the step S5) and repeats the process from the step S2. As described, the PLC judges that the causing route for the retrial processing is the route of the state of communication failure, when the number of retrials is equal to or more than the number "k".

(Processing of the Display Device and Content of Display)

Figure 6:
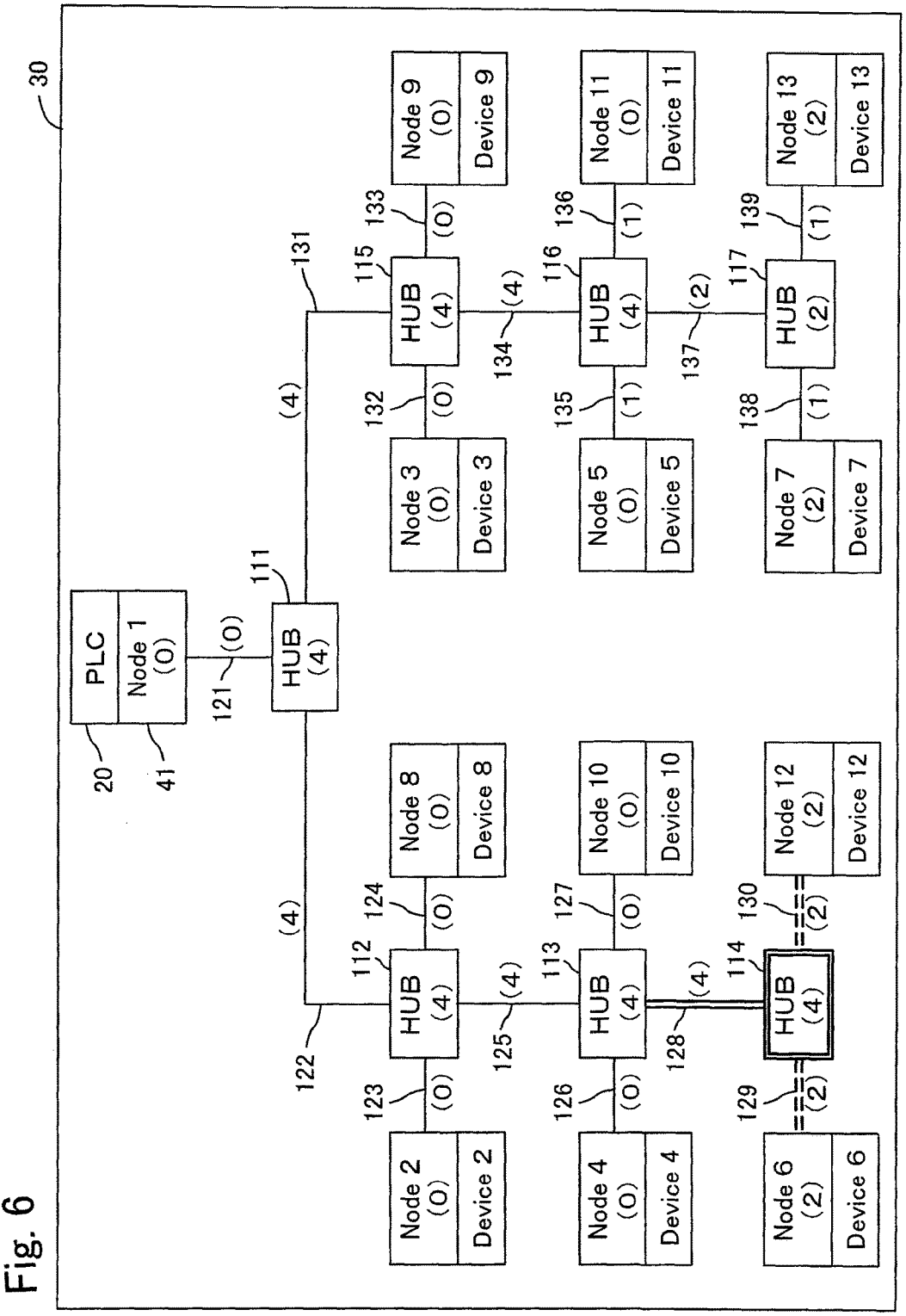
FIG. 6 is a view indicating the display displayed by the display device 30 at the time t30 in FIGS. 2 and 3, wherein the numerals in the HUB and the communication lines in parentheses respectively indicate the number of times of occurrence of the state of communication failure and the numerals in the nodes in parentheses indicate the number of times of execution of the retrial processing.
Figure 7:
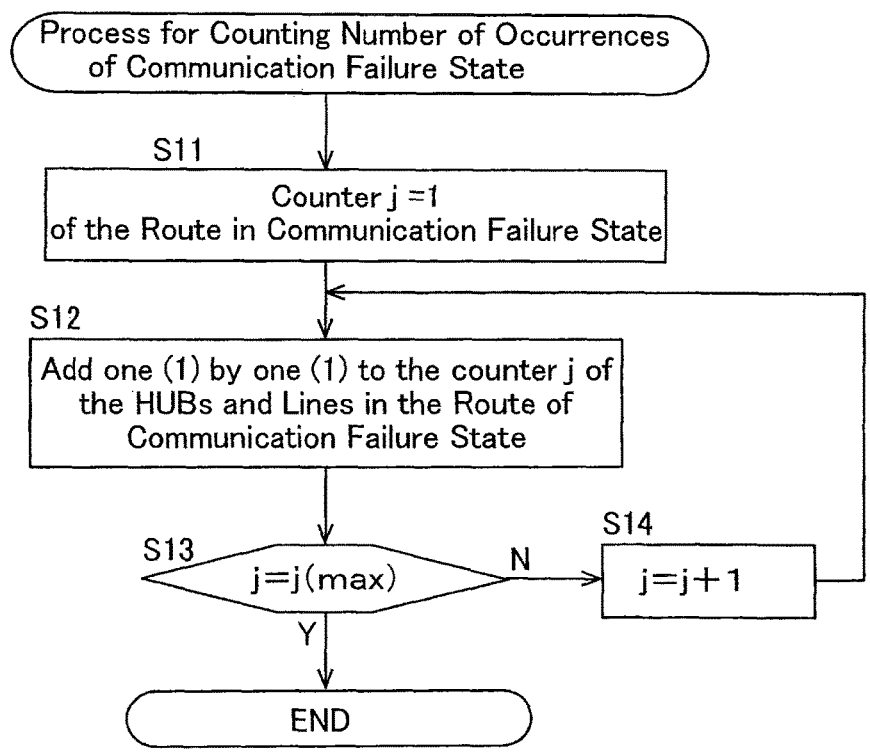
FIG. 7 is a flowchart showing the counting process for counting the number of times of the occurrence of the state of communication failure according to the display device 30 in FIG. 2.

Next, an example of communication failure state due to breakage of communication line 128 will be explained and the processing and display content of the display device 30 will be explained with reference to FIGS. 6 through 8. The display 30 displays all communication lines as shown in FIG. 6. In this communication line circuit, the number of retrials is displayed with a bracketed numeral at each of the nodes 1 through 13. For example, in the nodes 6, 7, 12 and 13, the numeral 2 is displayed with bracket and in the other nodes, the numeral zero (0) is displayed with bracket.

The display device 30 performs the counting processing of the number of occurrences of communication failure. The counting processing for the number of occurrences of communication failure means the calculation processing for calculating values corresponding to the number of occurrences of forming the route of communication failure state in the HUBs 111 through 117 and the lines 121 through 139. As shown in the flowchart in FIG. 7, first the counter "j" of the route which is in the state of communication failure is set to be one (1) (at the step S11). The counter "j" corresponds to the number of the routes that indicated the state of communication failure by the processing of the PLC 20 as shown in the flowchart in FIG. 5.

Next, the number one (1) is added to the number of times of the routes in the state of communication failure in the respective HUBs and the lines which become the state of communication failure (at the step S12). For example, in case of re-issuing of the token at the node 6, the route for forming the state of communication failure is formed by the HUBs and lines which connect the nodes 5 and 6, which are the HUBs 116, 115, 111, 112, 113 and 114 and the lines 135, 134, 131, 122, 125, 128 and 129. Each one (1) is added to the number which indicates the number of times forming the state of communication failure in these respective HUBs and the lines.

Next, when the counter "j" indicates the max value "j (max)", the process ends (at the step S13, Yes). However, the value "j" is less than the value "j (max)" (at the step S13, No), one (1) is added to the counter (at the step S14) and the process is repeated from the step S12. Thus, the number of times of forming the route of the state of communication failure is judged.

Thus, as shown in FIG. 6, the bracketed numerals which indicate the number of times of forming the route of the state of communication failure are displayed in the respective HUBs 111 through 117 and the lines 121 through 139 in the communication line circuit displayed on the display device 30. For example, the bracketed numeral four (4) is indicated in the HUBs 116, 115, 111, 112, 113 and 114 and the lines 134, 131, 122, 125 and 128, while the bracketed numeral two (2) is indicated in the HUB 117 and the lines 137, 129 and 130.

Figure 8:
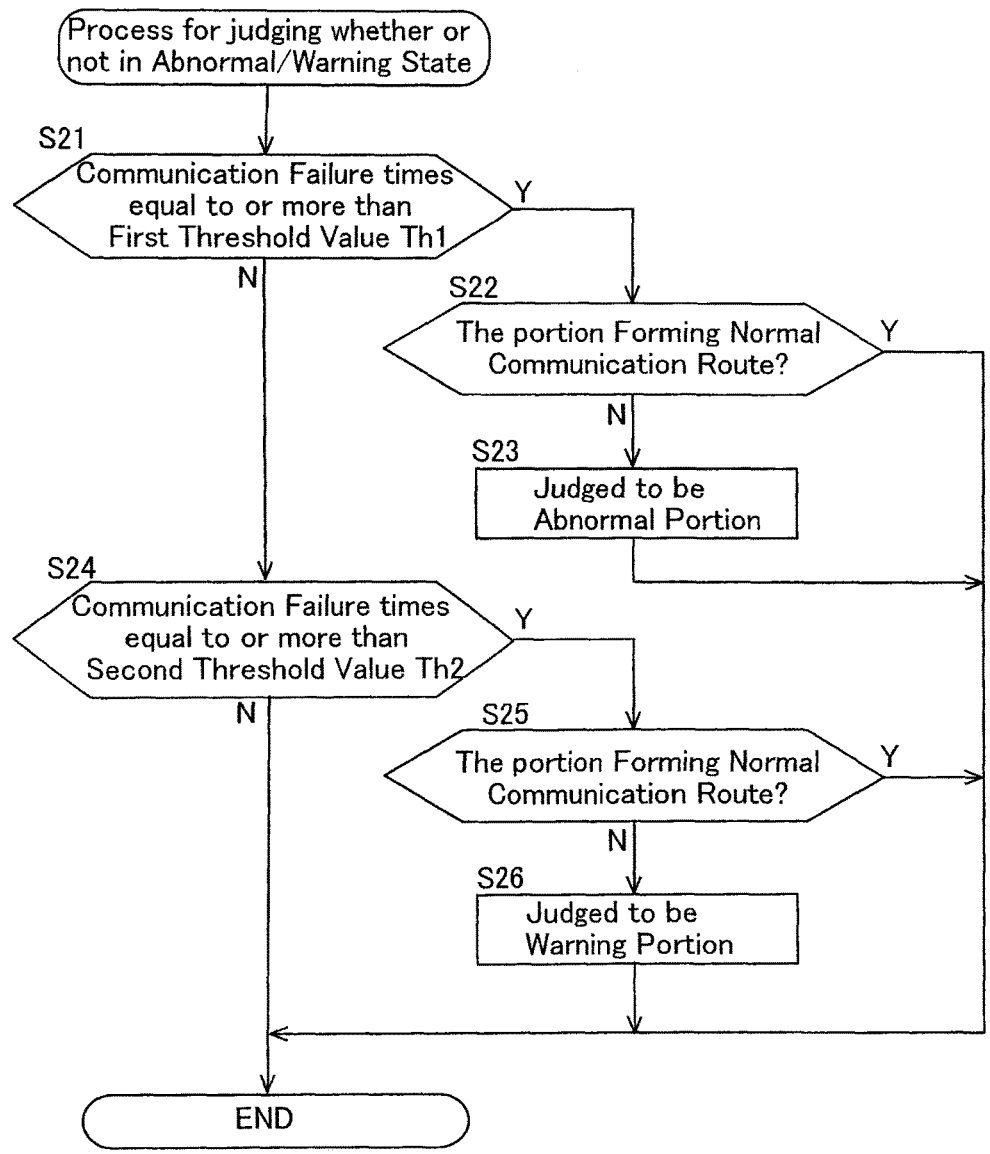
FIG. 8 is a flowchart showing the judging process for judging whether the state of the route is abnormal or warning according to the display device in FIG. 2.

Next, as shown in FIG. 8, the display device 30 judges whether a portion of the circuit is in abnormal state or in warning state. This judgment is made for the HUBs 111 through 117 and the lines 121 through 139, respectively. First, the display device 30 judges whether the number of times of the communication failure state is equal to or more than the first threshold value Th1 (at the step S21). It is noted here that the threshold value Th1 is assumed to be three (3). Accordingly, since each bracketed number indicated in the HUBs 114 and 116 is indicated as four (4) which is the number of times of forming the state of communication failure, the value is more than the assumed first threshold value 3.

When the number of times of forming the state of communication failure is equal to or more than the threshold value Th1 (at the step S21, Yes), it is further judged whether such portion forms the normal communication route or not (at the step S22). The normal communication route means that the route is in actually communicable state. For example, the route connecting the node 7 and node 8 is a normal communication route. The portions forming this normal communication route in this case are HUBs 117, 116, 115, 111 and 112 and the lines 138, 137, 134, 131, 122 and 124 in FIG. 6.

When judged that the portion forms normal communication route (at the step S22, Yes), the process ends without further processing. On the other hand when the portion is judged not to form a normal communication route, the portion is judged to be in abnormal state (at the step S23, No) and then the program ends without further processing. For example, although the HUB 116 indicates four (4) times of forming the state of communication failure, but this Hub 116 actually forms a portion of the normal communication route and accordingly, the HUB 116 is not judged to be abnormal but judged to be normal. The HUB 114 and the line 128 indicate four (4) for the number of times of forming the state of communication failure and are not the portions forming the normal communication route. Accordingly, the HUB 114 and the line 128 are judged to be the abnormal portions.

When the number of times of portion forming the state of communication failure is less than the first threshold value Th1 (step 21: N), then the display device 30 judges whether the indicated number is equal to or more than a second threshold value Th2 (step S24). Assuming that the value of the second threshold value Th2 is one (1), the HUB 117 and the line 129 indicating the number two (2) are judged to be the values more than the second threshold value Th2.

When the number of times of the portion forming the state of communication failure is equal to or more than the second threshold value Th2 (at the step S24, Yes), then the display device 30 judges whether the portion is forming a normal communication route or not (at the step S25). The normal communication route means as explained above that the route is in actually communicable state. When judged that the portion forms normal communication route (at the step S25, Yes), the process ends without further processing.

On the other hand, when the portion is judged to be not a normal communication route (at the step S25, No), the portion is judged to be in a warning state (at the step S26) and then the program ends without further processing. For example, the number in the HUB 117 indicates two (2) times of forming the state of communication failure, but this Hub forms a portion of the normal communication route and accordingly, the HUB 117 is not judged to be in warning state but judged to be normal. On the other hand the number in the line 129 indicates two (2) and is not a portion forming the normal communication route. Accordingly, the line 129 is judged to be a warning portion.

Further, as shown in FIG. 6, in the communication line circuit displayed on the display device 30, the portion judged to be the abnormal state is illustrated with the bold double solid line and the portion judged to be the warning state is illustrated with the bold double dotted line. The portion judged to be normal is illustrated with thin solid line.

According to the display device 30 of the embodiment, the normal, abnormal and warning levels are distinctly illustrated and displayed differently. In the drawing, such distinction over the normal, abnormal and warning portions is made by differentiating the boldness of the line, type of the line or the like from one another. This distinction can be made by using differently colored lines for each portion or moreover, such distinction can be made by using lighting or flashing.

(In Case the Line 126 and the HUB 114 are in the Abnormal State)

The case that the line 128 is broken has been explained heretofore, and now the case that portions other than the line 128 are broken or disconnected will be explained with reference to FIGS. 9 and 10.

Figure 9:
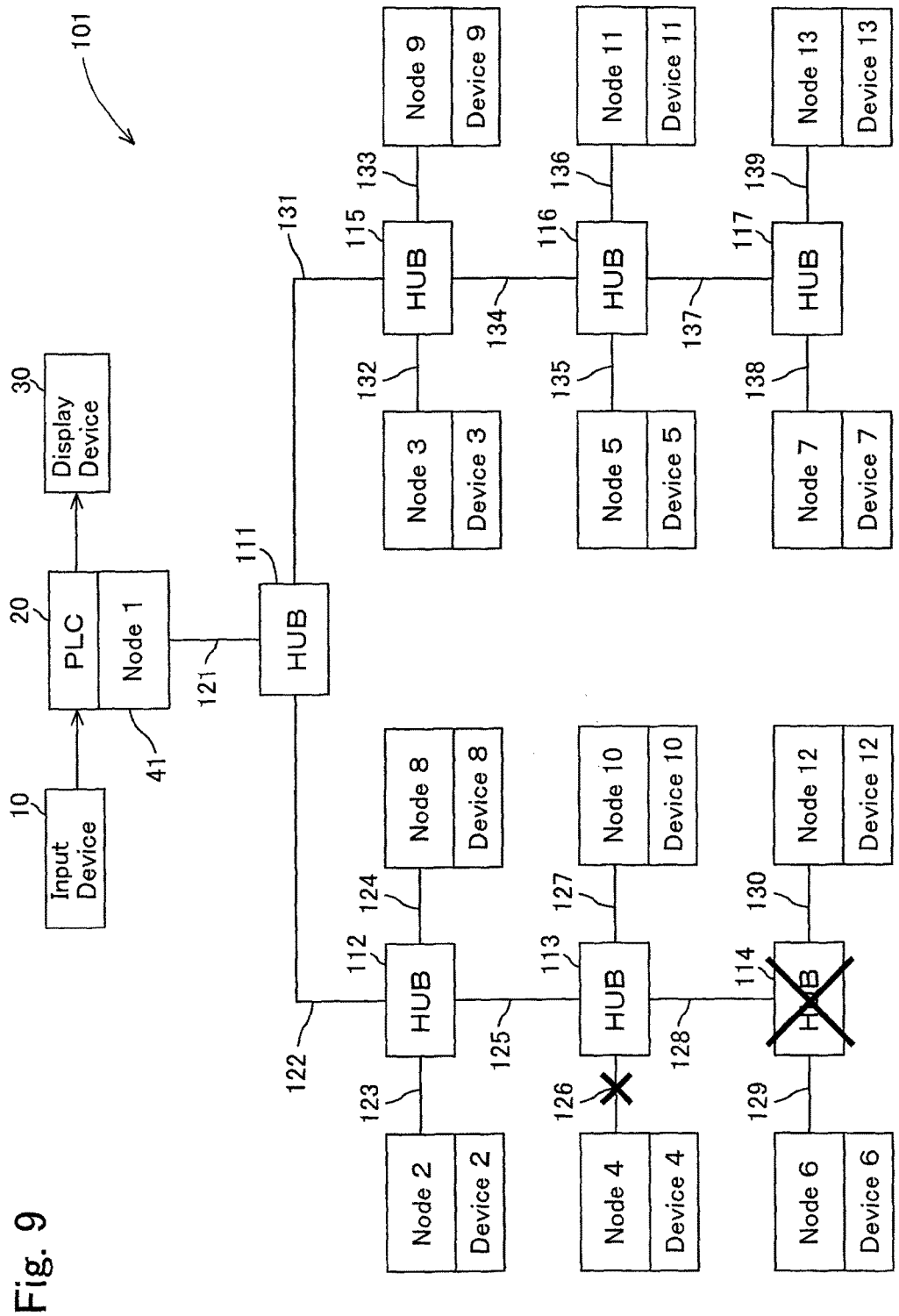
FIG. 9 is a view showing the network structure (PLC communication system) at a portion different from the portion in FIG. 2 is disconnected.

In FIG. 9, the PLC communication system 101 displays actual abnormal portion. As shown in the drawing, assuming that the line 126 and the HUB 114 are in abnormal state, the nodes 4 through 7, 12 and 13 execute retrial processing and the display device 30 displays the state of the system 101 as shown in FIG. 10. In FIG. 10, the nodes 4 through 7, 12 and 13 are presumed to have executed the retrial processing two times, respectively.

Figure 10:
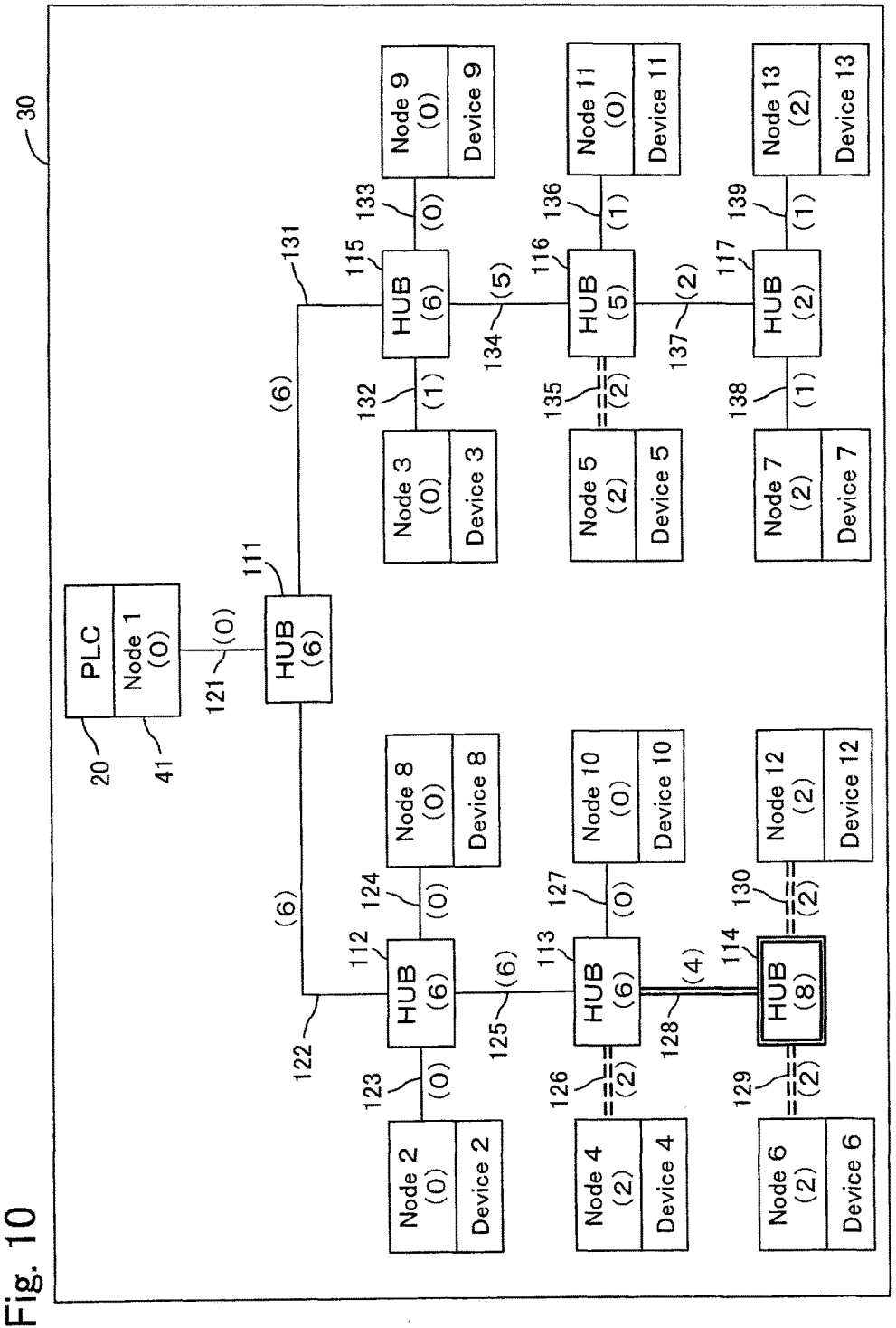
FIG. 10 is a view indicating the display displayed by the display device 30 in FIG. 9, wherein the numerals in parentheses in the HUB and communication lines indicate the number of times of occurrence of the state of communication failure and the numerals in parentheses in the nodes indicate the number of times of the execution of the retrial processing.

As shown in FIG. 10, the line 128 and the HUB 114 are displayed as the abnormal portion, the lines 126, 129, 130 and 135 are illustrated as the warning portion on the display device 30 and the portions other than the abnormal or the warning portion are illustrated as the normal portion. Thus, since the portion actually becoming abnormal includes the abnormal portion or the warning portion, the operator or worker of the system can find and specify an abnormal portion in early stage.

(The Effects of the First Embodiment of the Invention)

As explained, the display device 30 displays the abnormal portions of the HUBs 111 through 117 and the lines 121 through 139 based on the number of times of forming the route which indicates the state of communication failure. As apparent from the explanation above, more the number of times of the route which indicates the state of communication failure, highly likely the route has an abnormal portion. Thus, by displaying the portions depending on the number of times of forming the route which is in the state communication failure on the display device 30, workers or the operators engaged in the system can easily specify where the abnormal portions in the system are.

Further, the display device 30 displays the warning portions in addition to the abnormal portions distinctly differentiating from the abnormal portions. There may be some portions where likelihood of occurrence of abnormality in future is high, even though when the portions where the number of times of forming the state of communication failure is large, but not so large to form the route having the state of communication failure at present. By displaying such portions distinctly differentiating from the abnormal portions to be the warning portions, the worker engaged in the system keeps on eyes to such warning portion not to be developed to the abnormal portion.

Further, the display device 30 displays all communication lines as a network and at the same time displays the abnormal and the warning portions differently from the other portions (normal portions) so that the abnormal portions can be easily located from the display.

Still further, the display device 30 displays abnormal portions and warning portions from among the portions which have been judged to form a route of communication failure state, but excluding the portions forming the routes of normal communication state from among the HUBs 111 through 117 and the lines 121 through 139. When the hubs are used to form a network, there would be a case wherein one communication route formed between certain two nodes may form another communication route formed between another certain two nodes and accordingly, there would be a case wherein even the communication route formed between certain two nodes is in normal state, the communication route formed between different two nodes may be in communication failure state.

In such cases, the portion forming the normal communication route may be also counted as a portion forming the abnormal communication route (the route forming the state of communication failure). According to the above embodiments, for example, the number of times of communication failure state in the HUB 116 is indicated as four (4). Therefore, even when the portion is counted as the state of communication failure, if such portion is actually in normal state, the portion is excluded from the counting of abnormal portions and warning portions so that an accurate counting can be performed to correctly specify the portions of actually abnormal or warning states.

Further, the display device 30 displays the number of times of the route forming the state of communication failure in respective HUBs 111 through 117 and the lines 121 through 139. By counting and displaying the number of times of the portions forming the state of communication failure, what is happening in the abnormal portions and the warning portions can be confirmed thereby. Further, if a plurality of portions is judged to be in abnormal state, the order of executing abnormality test can be performed, for example, in order from the largest number to the smallest. Thus, an abnormal state in the system can be detected in early stage.

Further, the display device 30 displays the number of retrial processing in every node of the system. By further displaying the number of times of the retrial processing of the nodes, occurrence of abnormality or warning stage can be predicted in early stage, considering the number of times of executing retrial processing. Further, displaying the number of times of the retrials for each node can identify which node is in abnormal state. For example, if a plurality of portions is judged to be in abnormal state, the order of confirming an abnormality in the respective nodes can be decided, for example, in order from the largest number of times of retrial processing.

Modified First Embodiment

A modified structure of the first embodiment will be explained hereinafter with reference to FIG. 11. As explained above with reference to FIG. 6, the number of times of communication failures displayed on each HUB 111 through 117 and each line 121 through 139 corresponds to the number of routes forming such communication failure state. However, according to this modified embodiment, as illustrated in FIG. 11, the number of communication failures displayed on each HUB 111 through 117 and each line 121 through 139 corresponds to the number of times that the state of communication failure itself occurred from the time t1 to the time t30.

The retrial processing is carried out at the time t6 from node 6 to node 7, at the time t7 from node 7 to node 8, at the time t12 from node 12 to node 13, at the time t13 from node 13 to node 1, at the time t19 from node 6 to node 7, at the time t20 from node 7 to node 8, at the time t25 from node 12 to node 13 and at the time t26 from node 13 to node 1 between the time t1 and the time t30. The HUB 113 forms all of the above retrial routes and is counted as eight (8) times of occurrence of communication failure state in total. Therefore, the display device 30 displays the bracketed number eight (8) for the HUB 113. In this case, the first threshold value Th1 for judging the abnormal portion and the second threshold value Th2 for judging the warning portion are set differently. According to this modified embodiment, the effects of the first embodiment can be similarly obtained.

Second Embodiment

According to the embodiments above, the display device 30 displays the abnormal and the warning portions excluding the portions forming the normal routes. In the network structure which is formed by a plurality of and complex HUBs and the lines, a worker or an operator of the network can easily and surely specify the abnormal portions by structuring the system in a manner explained above. It is noted, however, that a smaller structured network may be sufficiently specify the abnormal portions even the normal portions forming the route of normal communication state are not excluded.

Therefore, another embodiment in which the display device 30 displays also the normal portions will be explained hereinafter with reference to FIGS. 12 and 13. Instead of judging process for the abnormal and the warning portions illustrated in FIG. 8 according to the first embodiment, FIG. 12 illustrates the judging process for the abnormal and the warning portions excluding the processes of judging whether or not forming normal route in the second embodiment. As shown in FIG. 12, whether or not the number of times of the communication failures is equal to or more than the first threshold value Th1 is judged at the step S31, if the judgment is Yes, (at the step S31, Yes), the portion is judged to be the abnormal portion (at the step S32).

Whether or not the number of times of the communication failures is less than the first threshold value Th1 is judged at the step S31, if the judgment is No, (at the step S31, No), whether or not the number of times of the communication failures is equal to or than the second threshold value Th2 is judged at the step S33. If the judgment is Yes (at the step S33), the portion is judged to be the warning portion (step S34). If the judgment is No (at the step S33), and also if the portion is judged to be the abnormal portion (S32) or the warning portion (S34), the process ends after the judgment.

In this case, the display device 30 displays the judging result as shown in FIG. 13. In detail, the portions which have been judged to form normal state communication routes (for example, the lines 134, 137 and etc.) in FIG. 6 are displayed as either the abnormal portion or the warning portion. Thus, the display device 30 displays the portions as the abnormal or warning portions in addition to the portions actually abnormal. This display can be applicable to a network structure of a smaller size.

Third Embodiment

Next, the PLC communication system 201 according to the third embodiment of the invention will be explained hereinafter with reference to FIG. 14. The PLC communication system 201 according to this embodiment corresponds to the portion of the network system illustrated in FIG. 1, wherein the portion includes the input device 10, PLC 20, display device 30, communication processing node 41 and DeviceNet network 200.

In the DeviceNet network 200, data communication is made according to the TCP (Transmission Control Protocol). The node 41, which is a master node of the network, sends data to the other nodes 241 through 248, which are the slave nodes to the master node 41. Then the nodes which received the data from the master node 41 send data to the master node 41. In detail, the master node 41 sends the data to the other nodes 241 through 248 based on the destination address for the data. If the master node 41 cannot send data to a particular slave node, a retrial processing is performed to re-send the data to the particular slave node.

Further, according to this embodiment, the network adopts the branched DeviceNet network. The nodes 41 and 241 through 248 are connected for data transmission through the HUBs 211 through 218 as the branch taps and the lines 221 through 236. Each node 241 through 248 is connected to the respective devices 251 through 258.

Further, as similar to the other embodiments, the PLC 20 recognizes the retrial processing causing portions as the routes in communication failure state when the number of retrial processing is equal to or more than a set value. In this embodiment, the PLC 20 recognizes the route connecting the master node 41 which is the sender of the data and the slave node which is the node of destination address and the subject node of retrial processing as the route in communication failure state.

Next, an example of abnormal state caused by a breakage of the line 230 as shown in FIG. 14 will be explained hereinafter. In this situation, as shown in FIG. 15, the data communication is performed from the master node 41 to the slave nodes 241 through 248 as time passed. As shown in FIG. 15, the data cannot be sent to the slave node 245 from the master node 41 at the time t4 due to the abnormality (disconnection of the line) in the line 230. Accordingly, the retrial processing is performed. The retrial processing is performed for the data to the slave node 246 at the time t5. Meanwhile, the data transmission continues until the time t27.

The display device 30 displays the system as indicated in FIG. 16. The number of times the node became the subject of retrial processing is indicated in parentheses for respective slave nodes 241 through 248. For example, the number of retrial processing for the slave node 245 is four (4) and similarly the number of retrial processing for the slave node 246 is three (3). These numbers are indicated in respective slave nodes. Also, the number of times of forming the route which became in communication failure state is indicated in the HUBs 211 through 218 and the lines 221 through 236.

The normal communication routes are excluded in judging whether the portion is in abnormal state or warning state. Thus, the line 230 and the HUB 216 are displayed as the abnormal portion and the lines 231 and 232 are displayed as the warning portion. The other portions are illustrated as the normal portion. Thus, according to the DeviceNet network 200 of this embodiment can exhibit the similar effects as the FL-net network 100 of the other embodiments.

Obviously, numerous modifications and variations of the present invention are possible in light of the above teachings. It is therefore to be understood that within the scope of the appended claims, the present invention may be practiced otherwise than as specifically described herein.

The invention claimed is:

1. A PLC communication system comprising:
a programmable logic controller (PLC);
a plurality of processing devices;
at least three communication processing nodes provided at the PLC and the plurality of processing devices respectively to establish communication among the PLC and the plurality of processing devices; and
an interconnecting device and a plurality of communication lines for connecting the communication processing nodes to form a communication route among the communication processing nodes, wherein
the PLC detects a communication failure state in the communication route formed by the communication processing nodes when a first communication processing node reissues data to a third communication processing node after failing to receive expected data from a second communication processing node, a content of the reissued data including a content of the expected data, and
a display device displays an abnormal portion in the communication route based on a number of occurrences of the detected communication failure state in the interconnecting device and the plurality of communication lines.

2. The PLC communication system according to claim 1, wherein the display device displays the abnormal portion in the communication route, excluding a portion forming a normal communication route from among the communication routes which are judged to be in the communication failure state in the interconnecting device and the plurality of communication lines.

3. The PLC communication system according to claim 1, wherein the display device displays a communication circuit including all of the communication routes and the abnormal portion in the communication routes by differentiating the abnormal portion from other portions.

4. The PLC communication system according to claim 1, wherein
the display device displays a portion in which the number of occurrences of the detected communication failure state is equal to or more than a first threshold value as the abnormal portion and a portion in which the number of occurrences of the detected communication failure state is less than the first threshold value and equal to or more than a second threshold value as a warning portion, and the display device displays the warning portion by differentiating the warning portion from the abnormal portion and other portions.

5. The PLC communication system according to claim 1, wherein the display device displays the number of occurrences of the communication failure state in the interconnecting device and the plurality of communication lines, respectively.

6. The PLC communication system according to claim 1, wherein an FL-net (FA LINK network) is used for the communication lines, each of the communication processing nodes receives and sends a token from one communication processing node after another, when the token is not received at the first communication processing node from second communication processing node, a retrial processing is executed, where a re-issued token, generated locally, is sent from the first communication processing node to the third communication processing node, and the PLC recognizes the communication route connecting the second and the first communication processing nodes to be the communication route which is in the communication failure state, after the retrial processing was executed with a predetermined number of times.

7. The PLC communication system according to claim 6, wherein the display device further displays a number of times of retrial processing in the each of the communication processing nodes.

8. The PLC communication system according to claim 1, wherein the PLC detects the communication failure state in the communication route formed by the communication processing nodes when the first communication processing node reissues data to the third communication processing node after failing to receive expected data from the second communication processing node within a predetermined time period.

9. The PLC communication system according to claim 1, wherein the reissued data and the expected data are both a data transmission privilege.

* * * * *